(No Model.)

C. F. LAVENDER.
WHEEL TIRE.

No. 516,790. Patented Mar. 20, 1894.

WITNESSES.
Emil Neuhart
Chas. F. Burkhardt

Charles F. Lavender INVENTOR.
By Wilhelm Bonner ATTORNEYS.

THE NATIONAL LITHOGRAPHING COMPANY,
WASHINGTON, D. C.

UNITED STATES PATENT OFFICE.

CHARLES F. LAVENDER, OF TORONTO, CANADA, ASSIGNOR OF ONE-HALF TO THOMAS FANE, OF SAME PLACE.

WHEEL-TIRE.

SPECIFICATION forming part of Letters Patent No. 516,790, dated March 20, 1894.

Application filed November 15, 1893. Serial No. 491,004. (No model.)

*To all whom it may concern:*

Be it known that I, CHARLES F. LAVENDER, a subject of the Queen of Great Britain, residing at the city of Toronto, in the county of York and Province of Ontario, Canada, have invented a new and useful Improvement in Wheel-Tires, of which the following is a specification.

This invention relates to tires which are removably fastened to the wheel rim, and more particularly to pneumatic tires in which the inner air tube is protected by a cover or envelope which may be opened for inserting and removing the air tube.

My invention has for its object to provide a simple fastening for the tire which reliably retains the same upon the rim, and which permits its ready removal from the rim for repairing the inclosed air tube.

Figure 1:
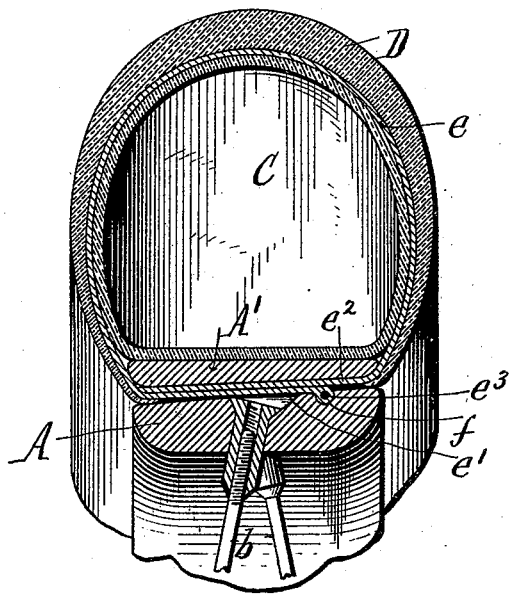
Figure 2:
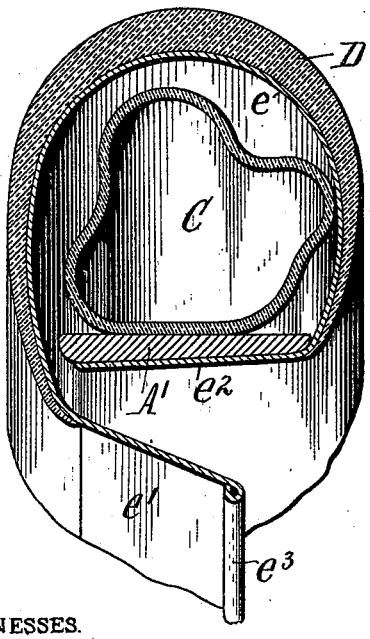
Figure 3:
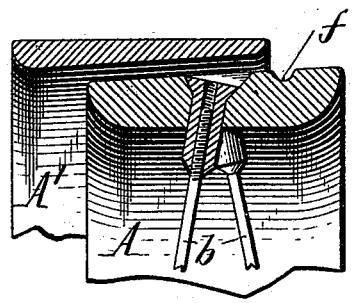

In the accompanying drawings:—Figure 1 is a cross section of the rim and tire of a velocipede wheel, containing my invention, the size of the parts being exaggerated for the sake of clearness. Fig. 2 is a detached cross section of the tire, showing its marginal edges separated. Fig. 3 is a cross section of the parts of the rim, separated from the tire.

Like letters of reference refer to like parts in the several figures.

The rim of the wheel consists of two parts or rings A A', the inner part forming the rim proper, to which the spokes $b$ are fastened, while the outer part is concentric therewith, and serves as a clamping band for securing the tire to the wheel rim. The clamping band is of substantially the same width as the inner ring of the rim, and the opposing faces of said ring and clamping band are flat and beveled transversely at a uniform angle from edge to edge of the rim. The latter and the band may be constructed of wood or metal.

C is the inner air tube which may be of any ordinary construction, and D is the outer cover or envelope which protects the air tube. This cover may be constructed of rubber, having the customary canvas lining $e$, and is open or split lengthwise on the side thereof, adjacent to the wheel rim, to permit the insertion and removal of the air tube when the tire is detached from the rim. The marginal portions $e'$ and $e^2$ of the cover are preferably made of sufficient width to overlap each other, and these marginal portions or flaps are clamped between the opposing beveled faces of the inner ring A and the clamping band A' of the rim. The inner flap $e^2$ of the cover is preferably secured with its inner side to the inner face of the clamping band by cementing or otherwise, so that said ring is carried by the cover when the tire is detached from the rim. The outer flap $e'$ of the cover is provided at its edge with a rib, bead or enlargement $e^3$ which is seated in a groove or depression $f$ formed in the face of the inner ring A, whereby the tire is held from lateral displacement on the rim. This rib and the groove receiving it, may extend around the entire edge of the cover, and the rib is preferably formed by hemming a cord in the edge of the cover. By this improved fastening the marginal portions or flaps of the cover are tightly wedged between the opposing beveled faces of the concentric rings of the rim, and the inflation of the air tube causes the outer ring or clamping band to be pressed firmly against the overlapping flaps of the tire cover, whereby the tire is securely held upon the rim.

When it is desired to repair the air tube, the tire is readily removed for this purpose, by deflating the air tube, so as to relieve the clamping band from pressure, and then pulling the tire laterally in the proper direction to separate the beveled faces of the clamping band and the inner ring and release the flaps of the tire cover. The flaps can now be opened, as shown in Fig. 2, permitting the air tube to be withdrawn.

The tire is applied to the wheel rim, after replacing the air tube, by folding the outer flap $e'$ of the cover against the inner flap $e^2$, placing the tire, with the attached clamping band, upon the inner ring of the rim and wedging it thereon until the rib $e^3$ of the cover enters the groove $f$ of said ring, and then inflating the air tube. When the clamping band is thus wedged upon the inner ring, the edges of the two rings are flush and the tire is centered on the rim as shown in Fig. 1.

I claim as my invention—

1. The combination with a wheel rim having a flat face, beveled transversely, from edge to edge of the rim, of a single clamping band of substantially the same width as the rim, surrounding the latter and having a flat inner face beveled transversely to correspond to the bevel of the rim face, and a pneumatic tire having a split cover or envelope provided with flaps or marginal portions, which are clamped between the beveled faces of the rim and clamping band, substantially as set forth.

2. The combination with a wheel rim composed of an outer ring or clamping band, and an inner ring having a groove or recess, of a tire consisting of an inner inflatable tube and a cover or envelope having one of its marginal portions provided with a rib or enlargement seated in the groove of said inner ring, substantially as set forth.

3. The combination with a wheel rim composed of an outer beveled clamping ring and an inner beveled ring having a longitudinal groove or recess in its face, of a tire consisting of an inner inflatable tube and a cover or envelope having its marginal portion clamped between the beveled rings of the rim, and having one of such marginal portions provided with a longitudinal rib or enlargement arranged in the groove of said inner ring, substantially as set forth.

4. The combination with the tire consisting of an inner inflatable tube and an open-sided cover or envelope, of a wheel rim composed of an inner beveled ring to which the spokes are secured, and an outer beveled ring or clamping band which is secured to one of the marginal portions of said envelope and adapted to clamp the intervening marginal portions of the tire cover against the inner ring of the rim, substantially as set forth.

Witness my hand this 11th day of November, 1893.

CHARLES F. LAVENDER.

Witnesses:
HERBERT McMULLEN,
H. P. WHARRIE.